United States Patent [19]

Scieri et al.

[11] 4,443,707
[45] Apr. 17, 1984

[54] HYDRO ELECTRIC GENERATING SYSTEM

[76] Inventors: Frank Scieri, 85 W. 18th St., Deer Park, N.Y. 11729; Richard L. Miller, Woolworth Bldg., 233 Broadway, Ste. 3612, New York, N.Y. 10007

[21] Appl. No.: 443,049

[22] Filed: Nov. 19, 1982

[51] Int. Cl.³ ............... F01K 23/10; F03B 11/02; H02P 13/20
[52] U.S. Cl. .................. 290/4 R; 240/4 A; 240/43; 240/52; 240/54
[58] Field of Search ............ 290/43, 52, 54, 4 A, 290/4 R, 1 R; 60/398; 405/75, 78

[56] References Cited

U.S. PATENT DOCUMENTS

| | | | |
|---|---|---|---|
| 1,734,955 | 11/1929 | Aspden | 290/47 |
| 1,891,868 | 12/1932 | Ceablom | 290/47 |
| 2,503,289 | 4/1950 | Nettel | 290/4 D |
| 2,820,148 | 1/1958 | Southwick | 290/4 D |
| 2,962,599 | 11/1960 | Pirkey | 290/43 |
| 3,651,331 | 3/1972 | Raeber | 290/4 A X |
| 3,882,230 | 5/1975 | Schmeller | 290/43 |
| 3,984,698 | 10/1976 | Brewer | 290/43 X |
| 4,059,770 | 11/1977 | Mackay | 290/4 C |
| 4,125,780 | 11/1978 | Greene | 290/4 A |
| 4,143,990 | 3/1979 | Atencio | 405/78 |
| 4,159,188 | 6/1979 | Atencio | 405/78 |
| 4,182,123 | 1/1980 | Ueda | 405/78 X |
| 4,188,788 | 2/1980 | Eller | 405/78 X |
| 4,200,807 | 4/1980 | Humiston | 290/1 R |
| 4,241,283 | 12/1980 | Stoner, Sr. | 290/43 X |
| 4,267,571 | 5/1981 | Cohn | 290/4 R X |
| 4,282,444 | 8/1981 | Ramer | 290/1 R X |
| 4,284,899 | 8/1981 | Bendiks | 290/1 R |
| 4,302,683 | 11/1981 | Burton | 290/4 R |
| 4,310,769 | 1/1982 | Mazzone et al. | 290/54 |
| 4,324,984 | 4/1982 | Borgren | 290/54 |
| 4,364,228 | 12/1982 | Eller | 290/52 X |
| 4,367,413 | 1/1983 | Nair | 290/52 |
| 4,367,890 | 1/1983 | Spirk | 290/54 X |
| 4,369,373 | 1/1983 | Wiseman | 290/54 X |
| 4,392,063 | 7/1983 | Lindquist | 290/52 X |
| 4,394,582 | 7/1983 | Kreissel et al. | 290/4 C |

*Primary Examiner*—J. V. Truhe
*Assistant Examiner*—Terry Flower
*Attorney, Agent, or Firm*—Richard L. Miller

[57] ABSTRACT

A hydro electric generating system to produce power by changing the potential energy of water to kinetic energy to drive a turbine that is coaxially connected to a generator. Water from the ambient enters the reservoir and is directed by a valve to a conduit to the turbine which turns a generator to produce electricity. The system is constructed in such a matter that it may supply power during peak power demand and be used as a storage system during low power demand.

7 Claims, 2 Drawing Figures

HYDRO ELECTRIC GENERATING SYSTEM

BACKGROUND OF THE INVENTION

This invention relates generally to a hydro electric generating system and more particularly to one that utilizes stored potential energy to operate a generator.

Increases in population and technological development have created unprecedented demands for new sources of energy. Water power has been long known as a source of potential energy for generating electricity. The combination of units in this invention represents an innovation in power generation. The individual units act synergestically to produce electricity as well as produce energy to feed other components. With the reservoir located at an appropriate height above the impulse turbine, the falling water from the reservoir possesses sufficient kinetic energy to activate the turbine. The turbine produces electricity and as the water exits the turbine it flows to the sump where it is returned to the reservoir via a motor powered pump. Part of the energy produced is utilized to drive the pump when necessary. Power can be stored in the form of potential energy in the reservoir.

Numerous electric generating system utilizing water have been provided in prior art that are adapted to produce energy. For example, U.S. Pat. No. 4,284,899-Bendicks, U.S. Pat. No. 4,241,283-Storer, and U.S. Pat. No. 4,324,984-Borgren, all are illustrative of such prior art. While these units may be suitable for the particular purpose to which they address, they would not be as suitable for the purposes of the present invention as herefore described.

SUMMARY OF THE INVENTION

It is an object of the present invention to have a hydro electric generating system utilizing water that converts potential energy to kinetic energy to drive a generator by means of a turbine.

It is another object of the present invention to provide a return pump operated by a motor powered by a generator to replenish the energy expended water.

Yet another object of the present invention is to provide a network system that will direct part of the produced electricity to operate the pump when necessary.

Yet another object of the invention is to provide a system that has the capability of storing energy during low demand from local utility so that energy can be returned to the individual user of the system during peak power demand at a lower cost.

Still yet a further object and benefit of the system is to have its energy storage potential raised in part by local rain fall run off.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows.

DETAILED DESCRIPTION OF THE PREFERRED EMBODIMENTS

Figure 1:
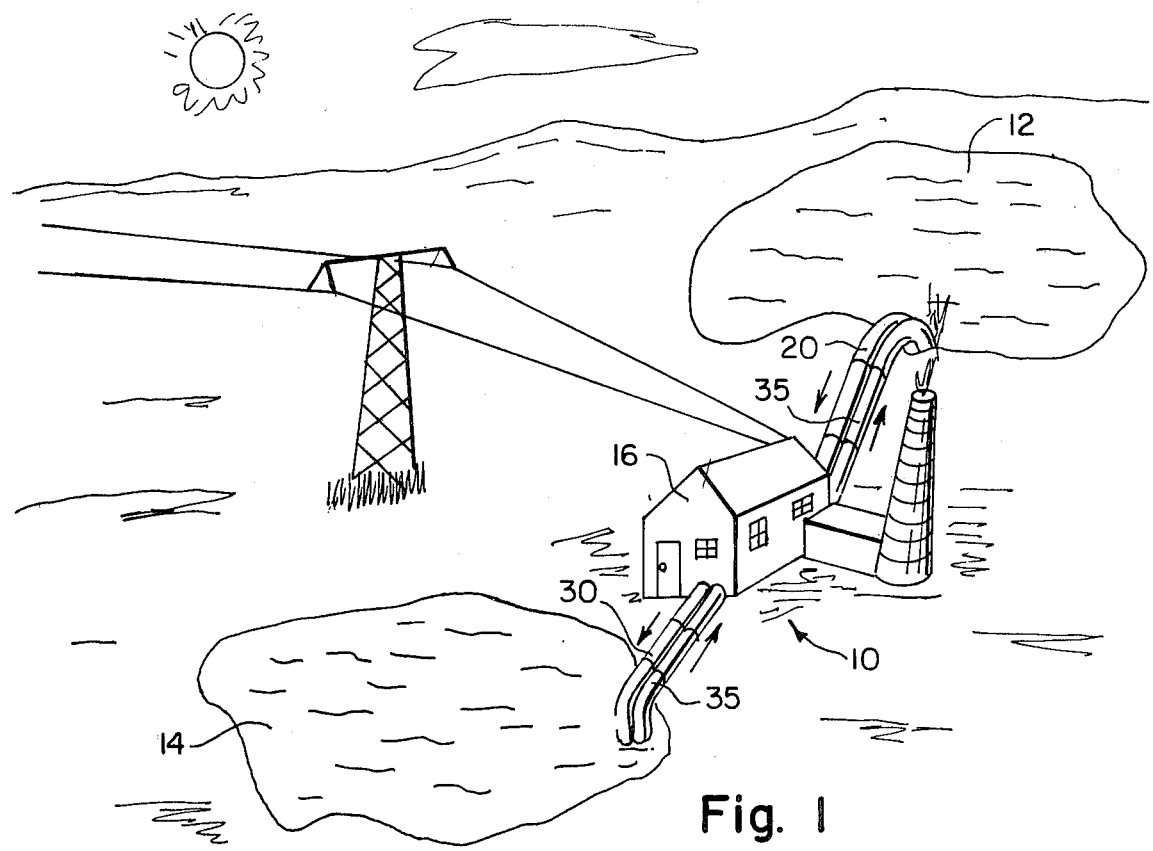
FIG. 1 is a landscape view of the present invention being physically situated.
Figure 2:
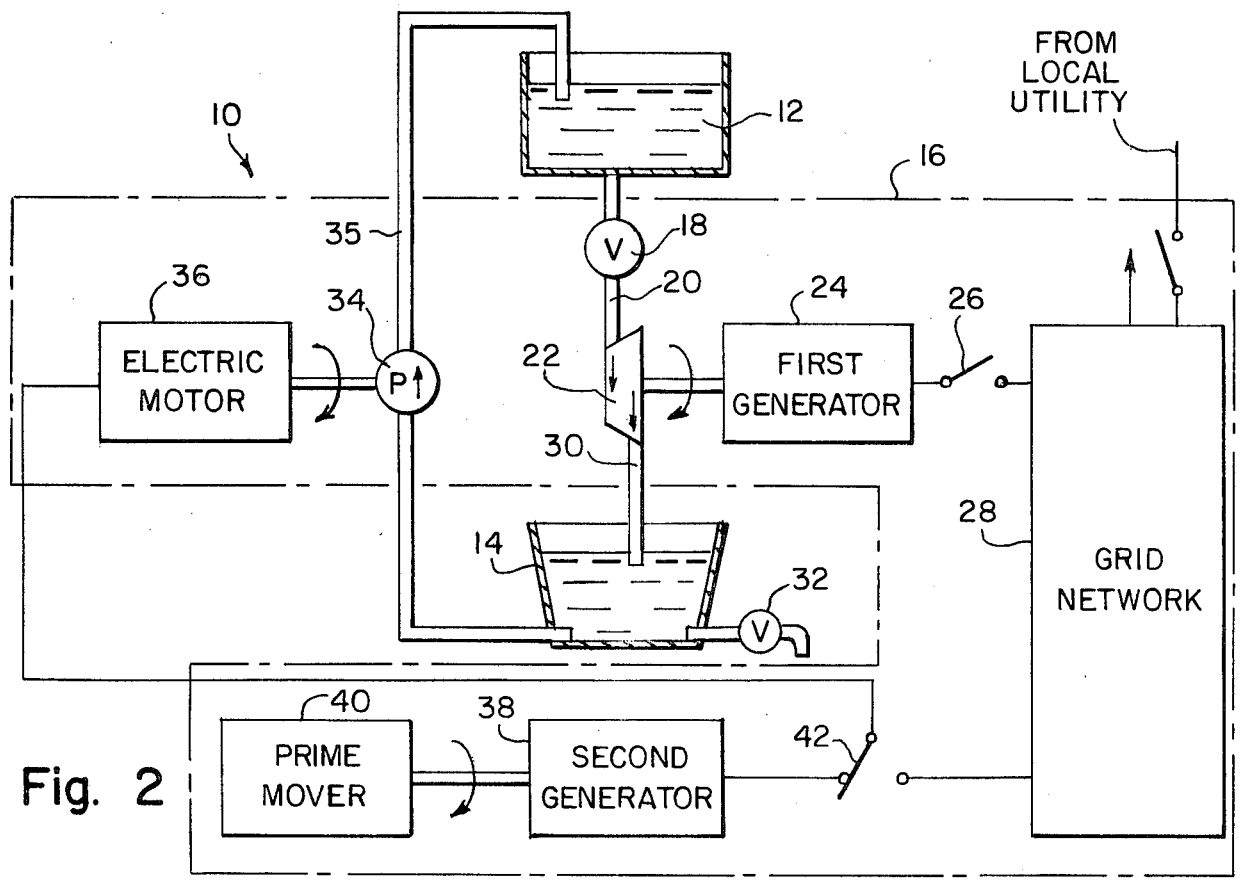
FIG. 2 is a schematic block diagram of the various components of a typical embodiment of the present invention shown in FIG. 1.

The hydro electric generating system of the present invention shown in FIG. 1 generally at 10 utilizing a reservoir 12, a sump 14 and a power station 16. Water may enter the reservoir either by rain or other natural incidents. One may understand the present invention more readily by examining the schematic drawing of FIG. 2. Water from rain or other natural or artificial means enters reservoir 12 and is stored there as potential energy. When valve 18 is opened the water is directed through a first conduit 20 to the impeller of water turbine 22. As the water passes by the impeller which is coaxially connected to first generator 24, electrical energy is produced. First generator 24 is wired via a first switch 26 to a power grid network 28 where the energy is distributed for immediate use either to user or back into utility system. Returning now to turbine 22, as the water revolves the impeller, it passes through a second conduit 30 which empties into sump 14. If there is excessive water in sump 14 this excess may be emptied by drain valve 32 or allowed to be absorbed by the earth's natural water table in some cases. In order to return the water to the reservoir there is a pump 34 installed in conduit 35. Pump 34 is operated by electric motor 36 which may receive its power from, second generator 38 which is revolved by a coaxially connected prime mover 40 such as a separate internal combustion engine, or from the grid network 28, which is supplied power by the local power utility, depending upon the position of second switch 42.

For further clarification it should be mentioned that grid network 28 would normally contain synchronous circuitry so that generator 24 would only be switched on line when synchronized voltage magnitude and phase were close to that of the line so that large circulating currents would not be produced as is well known in the state of the art.

It should be understood that depending upon the individual requirements of the user that reservoir 12, and sump 14, may vary in construction and size considerably and in some case both might be swimming pool built at different altitudes on the land scape, mountain side, etc. It is also conceivable that the reservoir and sump might be closed tanks for the smaller independent user, however in that case the benefits of additional rain run off energy input would not be normally available to the system.

In order to better understand the operation of the system some of its typical uses will be enumerated as follows:

(1) During the failure of a local power company to produce power because of down power lines, etc the system can be utilized to supply the user with independent power for a time depending upon the users needs and the size of the system.

(2) During the time when peak power requirements are high by local users and utilities can not supply enough power or charge a higher rate the system may be utilized, to either supply power to the individual user, or in some cases back to the utility for a charge by or credit to the user.

(3) When the system is used in rural areas where a local utility is not available the system can be operated so that during the time when power usage requirements are low (all night for example) the potential energy of the system can be raised by using prime mover system 40, and generator 38 to supply power to electric motor 36 in order to run pump 34 to replenish the water supply of reservoir 12. Then when peak power is required (during the day for example) both generator 24, and generator 38 can be utilized to supply larger amounts of power than if just one generator was available.

While certain novel features of this invention have been shown and described and are pointed out in the annexed claims, it will be understood that various omissions, substitutions and changes in the forms and details of the device illustrated and in its operation can be made by those skilled in the art with out departing from the spirit of the invention.

What is claimed is:

1. A hydro electric generating system comprising, in combination, a reservoir, an impulse turbine, said reservoir being located above said turbine, said turbine including an impeller means, a first conduit means extending downwardly from said reservoir to said turbine for conducting by gravitational fall the water from said reservoir to said turbine impeller means to cause rotation of said impeller means, said impeller means being coaxially connected to a first generator which produces electricity upon rotation of said impeller means, a sump for recovery of energy expanded water as it exits said impeller means, a second conduit means connecting said turbine with said sump for conducting water from said turbine impeller means to said sump in preparation for recovery, a third conduit means connecting said sump to said reservoir with an intermediate pump, said pump being powered by an electric motor, a second generator, a prime mover activating said second generator, an electric grid network, a first switch means for selectively applying the electricity produced by said first generator to said grid network whereby said electricity produced by said first generator can be used directly by a user or fed into the electric grid network, and a second switch means for selectively coupling said electric motor to said electric grid network or to said second generator, whereby said electric motor can be operated by said electric grid network or said prime mover.

2. A hydro electric generating system as in claim 1 further comprising, means for combining the distribution of electrical energy to a user so that a portion is derived from gravitational kinetic means and a balance portion is supplied by a prime mover means.

3. A hydro electric generating system as in claim 2, wherein said prime mover means is a separate internal combustion engine coupled mechanically to said second generator.

4. A hydro electric generating system as in claim 1 further comprising, means for combining the distribution of electrical energy to a user so that a portion is derived from gravitational kinetic means and a balance portion is supplied by a utility.

5. A hydro electric generating system as in claim 1, further comprising a valve displaced in said first conduit for directing water from said reservoir to said turbine.

6. A hydro electric generating system as in claim 5, further comprising a drain on said sump for purging rain water that is in excess so that it may be returned to the ground via a water table.

7. The hydro electric generating system as in claim 1 wherein said reservoir stores potential energy.

* * * * *